Patented Aug. 3, 1948

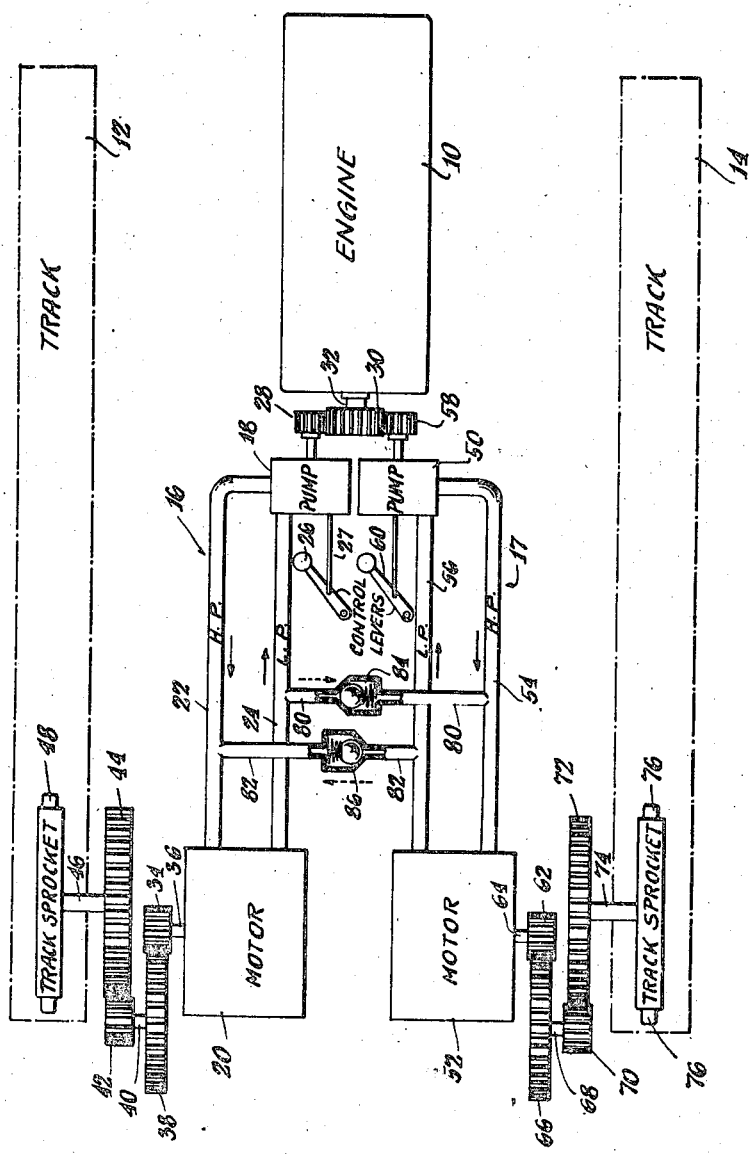

2,446,242

UNITED STATES PATENT OFFICE 2,446,242

HYDRAULIC DRIVE CONTROL MECHANISM FOR VEHICLES

Elias Orshansky, Jr., Stamford, Conn., assignor to The Acrotorque Company, Stamford, Conn., a corporation of Connecticut Application October 22, 1946, Serial No. 704,886

4 Claims. (Cl. 180—9.2)

1

This invention relates to a vehicle drive control mechanism, particularly to a hydraulic control arrangement for employment with the driving mechanism of tanks or tractors, and has for its principal object to provide an improved hydraulic transmission in which the pump units may be of smaller size than that of the associated motor units.

In vehicles utilizing treads of the endless type it is customary to couple a pair of hydraulic transmissions to the driving engine, one for each tread. Each motor unit thereof is generally characterized by low speed, high torque, and large stroke; while the associated pump unit is characterized by high speed, low torque, and small stroke. If the pump and motor were irreversible, that is, if they were to operate respectively as a pump and motor continuously, a pump of smaller capacity than the motor could be used. However, the pump is at times driven as a motor, particularly while turns are being executed by the vehicle, i. e., the inertia of the tank, which may be travelling at a high velocity, will cause the one motor to be driven as a pump so that the originally designated pump is forced to function as a motor and thus take up the entire liquid output of the newly operating pump. As a consequence it has been necessary heretofore, as far as applicant is aware, to provide a pump unit substantially the size of the motor unit in view of said reversibility.

It is, therefore, another object of the invention to provide an improved drive mechanism for a track type vehicle in which during reversal of operation of a motor unit a portion of the liquid flow is shunted between the two motor units without passing through the pump units.

With the above objects in view, one embodiment of the invention discloses schematically a hydraulic regenerative system for driving and steering a track vehicle in which each track is mechanically coupled to a motor unit driven through hydraulic lines by a manually controlled smaller pump, which, in turn, is mechanically connected to a prime mover. Both sets of hydraulic lines are bridged by a pair of conduits in which the high pressure line of one set is connected to the low pressure line of the other set with a control valve in each conduit so directed that upon the vehicle making a turn, a second hydraulic circuit is rendered effective through said conduits to take care of the increased liquid flow developed by one of the larger motor units. In other words, the increased liquid flow provided by the one large motor unit is circulated

2 through the other large motor unit without passage through the smaller pump units.

A more complete understanding of the invention will be obtained from the following description of a preferred embodiment thereof, taken in conjunction with the accompanying drawing, which schematically illustrates a pair of tracks for a tractor type vehicle, each track being connected through a manually controlled hydraulic transmission to a driving source.

Referring now to the drawing, there is shown in block form a prime mover 10, of any suitable type, such as an internal combustion engine, for driving two endless tracks 12, 14 of a tractor or tank type vehicle (not shown). Intermediate the engine 10 and tracks 12, 14 is shown a pair of hydraulic transmissions 16 and 17 coupled respectively to tracks 12 and 14. Transmission 16 comprises a pump 18, preferably of variable stroke, and a motor 20 of fixed stroke interconnected by a high pressure line 22 and a low pressure line 24. Both hydraulic pump and motor units are preferably of the positive displacement type in which reciprocating pistons are employed, although any suitable type of hydraulic pump and motor may be used. A pivotally mounted control lever 26 connected in any suitable manner to the pump 18, such as by the usual linkage 27, is provided for varying the stroke of the pump. The pump 18 is shown connected to engine 10 through a gear coupling comprising pinion 28 in mesh with a gear 30 carried by an engine shaft 32. The gear coupling, comprising pinions 28 and 30, is of such ratio that the speed of the pump is increased substantially above that of the engine shaft. Connection and disconnection of the shaft 32 from the engine 10 is accomplished through the usual clutch mechanism (not shown).

The motor 20 is coupled to the track 12 by a speed reduction gear train comprising a pinion 34 fixedly carried by motor shaft 36 in mesh engagement with a gear 38, which is fixedly supported upon one end of a shaft 40, the other end of which is rigidly coupled to a pinion 42. A gear 44 is shown in mesh with pinion 42 and this gear is rigidly carried upon a shaft 46 which, in turn, rigidly carries a track sprocket 48. Track 12 is in mesh engagement with sprocket 48 and is thus driven thereby.

Similarly, transmission 17 comprises a pump 50 and a motor 52 interconnected by a high pressure line 54 and a low pressure line 56. Pump 50 is also of variable stroke and is connected to a pinion 58, which meshes with the gear 30 of engine 10. Both pinions 28 and 58 have the same number of teeth, so that identical velocities will be imparted to pumps 18 and 50 by the engine 10. A pivotally mounted control lever 60, independent of lever 26, is adapted for varying the stroke of pump 50. Motor 52 is connected to track 14 by a similar reduction gear train comprising a pinion 62 rigidly carried upon motor shaft 64, pinion 62 being in mesh engagement with a gear 66. A shaft 68 rigidly carried by gear 66 is also fixedly coupled to a pinion 70, which is in mesh engagement with a gear 72, which, in turn, is fixedly coupled through a shaft 74 to a track sprocket 76. Track sprocket 76 is adapted for mesh engagement with track 14 and thereby normally drives this track.

It is readily apparent, from what has been described hereinbefore, that the engine 10 is adapted to drive both transmissions 16 and 17 concurrently through the gear 30 and pinions 28, 58. In other words, assuming that the control levers 26 and 60 are in identical positions, that is, the strokes of both pumps 18 and 50 are identical, motors 20 and 52 will drive tracks 12 and 14, respectively, at the same rate of speed. With such a setting, the tractor or tank will be driven on a straight-away course. To vary the direction of the vehicle, it is merely necessary to vary the stroke of one of the pumps. Thus, if it is desired to turn the vehicle in a direction to the right, as viewed in the drawing, the stroke of the pump 18 may be decreased, to increase its speed, while the stroke of the pump 50 is kept in the same position. Or, the stroke of pump 50 may be increased, that is, to decrease its speed, while the stroke of pump 18 is maintained in the same position. Assuming that the stroke of pump 50 has been increased, by movement of lever 60 in the proper direction, liquid flow developed by pump 50 through hydraulic lines 54 and 56 will be decreased, so that motor 52 likewise will normally decrease in speed with the result that track 14 will be retarded in its rotation. However, in vehicles of the type, such as tanks, etc., traveling at a high velocity, a reduction in rotation of one of the tracks, such as 14 in this case, will bring about a reversal of the operation of the pump 50 and motor 52, since the track 14 will strive to continue at the same speed. That is, the inertia of the vehicle will tend to drive the motor 52 as a pump, so that the motor 52 will cause an increased flow of liquid via the lines 54 and 56 through the pump 50. The pump 50 must therefore be of size sufficient to carry all of the liquid developed by the motor 52. Accordingly, it has been the practice heretofore to provide a pump 50 substantially the size of the motor 52, particularly to take care of those cases where reversal of operation of the transmission occurs.

To enable the use of a smaller pump, and thereby decrease the cost of the transmission, as well as reduce the weight thereof, applicant has devised an arrangement whereby, upon such reversals, the excess liquid from the motor will be by-passed to the other motor instead of passing through the pump. As shown in the drawing, a conduit 80 is interposed between high pressure line 54 and low pressure line 24 and a second conduit 82 is interposed between low pressure line 56 and high pressure line 22. A control valve 84 is disposed within conduit 80 and so arranged that liquid flow is normally prevented from passing from high pressure conduit 54 to low pressure conduit 24; while a control valve 86 is disposed in conduit 82 and so directed that liquid flow is normally interrupted from high pressure line 22 to low pressure line 56. Valves 84 and 86 may be of any suitable type and, as shown, are of the ball check type. It is readily seen that liquid flow between the two sets of hydraulic lines can only take place when the pressure in the low pressure lines 24 and 56 exceeds the pressures of the high pressure lines 22 and 54, respectively. Thus, in the normal function of the transmissions 16 and 17, liquid flow will occur in accordance with the solid arrows shown on the drawing.

Assuming again that a right turn is to be executed (with the conduits 80 and 82 added to the vehicle as shown), motor 52, being driven by track 14 because of the inertia of the vehicle, as described in the preceding example, will cause liquid between motor 52 and pump 50 to flow in the same direction, as shown by the solid arrows. However, the low pressure line 56 now becomes the high pressure line and, correspondingly, the high pressure line 54 becomes the low pressure line, in view of the fact that the motor unit is acting as a pump. As a result of the increase of liquid flow now developed by unit 52 through lines 56 and 54, the pressure in line 56 will exceed the pressure in high pressure line 22 of the other transmission 16 and cause the opening of check valve 86, so that a liquid circuit is provided from motor 52 via line 56, conduit 82 including check valve 86, high pressure line 22, through motor 20, and thence back over low pressure line 24, which, in view of the increased flow of liquid through motor 20, will develop a higher pressure than the low pressure liquid in the hydraulic line 54, so that check valve 84 will also be opened to permit liquid flow therethrough, the circuit being further traced via conduit 80 and conduit 54 to motor 52. At the same time, the liquid in the circuit between motor 52 and pump 50 will be of such quantity that the capacity of pump 50 will not be exceeded. In other words, both motors 52 and 20 are hydraulically interconnected while turns are being executed and yet, at the same time, are hydraulically connected to their associated pump units. The above condition will continue as long as the inertia of the vehicle causes the motor to be driven as a pump. However, as soon as the motor resumes its function as such and is driven by the pump, the check valves 84 and 86 will close and the liquid will flow solely through the pump 50 over lines 54 and 56. It is thus seen that a novel yet simple arrangement is devised for reducing the size of the pump in a hydraulic transmission for driving high-speed tanks or tractor vehicles.

While the features of this invention have been disclosed with reference to the specific embodiments shown, it is, of course, understood that various modifications may be made in the details thereof without departing from the scope of this invention as defined in the appended claims.

What is claimed is:

1. In a motor vehicle of the type having traction elements at opposite sides thereof in which turning is effected by varying the relative velocity of the traction elements, the combination with a separate hydraulic motor, hydraulic circuit, and hydraulic pump independently connected to each element, of means for interconnecting said circuits including a pair of conduits bridged across the hydraulic circuit of each of said pumps and motors, and one-way valve means in each of said conduits for rendering said conduits effective for liquid flow therethrough for delivering operating pressure to one of said circuits when the motor of said other circuit is driven by its associated element as a pump.

2. In a vehicle having a pair of traction elements at opposite sides thereof adapted for moving and steering said vehicle, in combination, a hydraulic transmission for driving each of said traction elements; a prime mover coupled to both of said transmissions for imparting power thereto; each transmission comprising a pump connected to said prime mover, a motor connected to one of said elements, and a high pressure and a low pressure hydraulic line interconnecting said pump and motor; a pair of conduits connected from the high pressure and low pressure lines of one transmission respectively to the low pressure and high pressure lines of the other transmission; and means disposed in said conduits to permit one-way liquid flow therethrough for delivering operating pressure from the low-pressure line of one transmission to the high-pressure line of the other transmission when the motor of said first transmission is driven by its associated element as a pump.

3. In a tractor type of vehicle having a traction element at each side thereof adapted for moving and steering said vehicle, in combination, a hydraulic transmission for driving each of said traction elements; an engine coupled to said transmissions for imparting power thereto; each transmission comprising a pump connected to said engine, a motor connected to one of said elements, and a high pressure and a low pressure hydraulic line for interconnecting said pump and motor; a pair of conduits connected from the high pressure and low pressure lines of one transmission respectively to the low pressure and high pressure lines of the other transmission; and means including a one-way valve disposed in each of said conduits for permitting liquid flow therethrough for delivering operating pressure from the low-pressure line of one transmission to the high-pressure line of the other transmission when the motor of said first transmission is driven by its associated element as a pump.

4. In a vehicle having a pair of traction elements at opposite sides thereof for moving and steering said vehicle, in combination, a hydraulic transmission for driving each of said traction elements; a prime mover coupled to said transmissions for imparting power thereto; gear means for interconnecting said prime mover and said transmissions, each transmission comprising a pump conneced to said engine, a motor connected to one of said elements, and a pair of conduits for flow of liquid therethrough interconnecting said pump and motor; gear means for interconnecting each of said motors with its associated element, a pair of conduits bridged across the high pressure and low pressure lines of one transmission to the low and high pressure lines of the other transmission, and a check valve disposed in each of said conduits for permitting liquid flow therethrough for delivering operating pressure from the low-pressure line of one transmission to the high-pressure line of the other transmission when the motor of said first transmission is driven by its associated element as a pump.

ELIAS ORSHANSKY, Jr.

REFERENCES CITED

The following references are of record in the file of this patent:

UNITED STATES PATENTS

| Number | Name | Date |
|---|---|---|
| 710,486 | Manley | Oct. 7, 1902 |
| 1,307,819 | Janney | June 24, 1919 |
| 2,036,437 | Reudiger | Apr. 7, 1936 |
| 2,336,911 | Zimmermann | Dec. 14, 1943 |